US008548252B2

(12) United States Patent
Yildiz et al.

(10) Patent No.: US 8,548,252 B2
(45) Date of Patent: Oct. 1, 2013

(54) EDGE DETECTION

(75) Inventors: Yesna Oyku Yildiz, Ankara (TR); Douglas Q. Abraham, Topsfield, MA (US)

(73) Assignee: Analogic Corporation, Peabody, MA (US)

( * ) Notice: Subject to any disclaimer, the term of this patent is extended or adjusted under 35 U.S.C. 154(b) by 402 days.

(21) Appl. No.: 12/864,645

(22) PCT Filed: Jul. 31, 2008

(86) PCT No.: PCT/US2008/071755
§ 371 (c)(1),
(2), (4) Date: Oct. 19, 2010

(87) PCT Pub. No.: WO2009/094044
PCT Pub. Date: Jul. 30, 2009

(65) Prior Publication Data
US 2011/0033118 A1 Feb. 10, 2011

(51) Int. Cl.
*G06K 9/00* (2006.01)
*G06K 9/48* (2006.01)
*G06K 9/40* (2006.01)

(52) U.S. Cl.
USPC .................. 382/199; 382/131; 382/263

(58) Field of Classification Search
USPC ................................ 382/199, 263
See application file for complete search history.

(56) References Cited

U.S. PATENT DOCUMENTS

| 6,104,831 | A  | * | 8/2000  | Ruland .................. 382/173 |
| 7,199,902 | B2 | * | 4/2007  | Hiroshige et al. ............ 358/1.9 |
| 2004/0097922 | A1 | * | 5/2004  | Mullaney ........................ 606/53 |
| 2006/0245008 | A1 |   | 11/2006 | Kohashi |

OTHER PUBLICATIONS

Yildiz; et al., "Projection Image Enhancement for Explosive Detection Systems", 2008, http://spiedigitallibrary.org/proceedings/resource/2/psisdg/6812/1/681208_1?isAuthorized=no.

Kang; et al., "SAR Image Edge Detection by Ratio-based Harris Method", http://ieeexplore.ieee.org/articleSale/Sarticle.jsp?arnumber=1660473, ICASSP May 14-19, 2006.

Ganugapati; et al., "A Ratio Based Edge Detector for Speckled Images Based on Maximum Strength Edge Pruning", International Conference on Image Processing, http://ieeexplore.ieee.org/xpl/freeabs_all.jsp? amumber=537440, Oct. 23-26, 1995, pp. 165-168.

Bai; et al., "An improved ratio edge detector for target detection in sar images" Neural Networks and Signal Processing, 2003. Proceedings of the 2003 INternational Conference on Nanjing, China Dec. 14-17, 2003, Piscataway, NJ, USA, IEEE, vol. 2, Dec. 14, 2003, pp. 982-985.

(Continued)

*Primary Examiner* — Uptal Shah
(74) *Attorney, Agent, or Firm* — Cooper Legal Group LLC (57) ABSTRACT

One or more techniques and/or systems for detecting edges in images of objects subjected to imaging using imaging apparatus are disclosed, such that the effect of image noise on the edge detection can be mitigated. Ratios of intensity values (e.g., signal values) for a subject region (e.g., a pixel) and respective adjacent regions are determined. An adaptive threshold value is determined for respective adjacent region pairs. The ratio value is compared to the adaptive threshold value for respective adjacent region pairs, to determine whether an edge is present between the respective adjacent region pairs.

20 Claims, 7 Drawing Sheets

(56) References Cited

OTHER PUBLICATIONS

Singh; et al., "Optimizing image enhancement for screening luggage at airports" Computational Intelligence for Homeland Security and Personal Safety, 2005. CIHSPS 2005. Proceedings of the 2005 IEEE International Conferen Ce on Orlando, FL, USA Mar. 31-Apr. 1, 2005, Piscataway, NJ, USA, IEEE, Mar. 31, 2005, pp. 131-136.
De Santis; et al., "An efficient adaptive algorithm for edge detection based on the likelihood ratio test" International Journal of Adaptive Control and Signal Processing Wiley UK, vol. 16, No. 4, May 2002, pp. 289-308.
Ding; et al., "On the Canny edge detector" Pattern Recognition, Elsevier, GB, vol. 34, No. 3, Mar. 1, 2001, pp. 721-725.
International Search Report in related PCT application No. PCT/US2008/071755 dated Sep. 23, 2009.
Second Chinese Office Action cited in Chinese Application No. 200880125437.0 dated Nov. 12, 2012, 7 pgs.
"Notification Concerning Transmittal of International Preliminary Report on Patentability" Cited in related application No. PCT/US2008/071755 Dated Aug. 5, 2010.
"First Chinese Office Action" cited in related application No. 2008801254370 dated Feb. 22, 2012.
Third Chinese Office Action cited in Chinese Application No. 200880125437.0 dated Mar. 12, 2013, 5 pgs.

\* cited by examiner

EDGE DETECTION

BACKGROUND

Security at airports and in other travel related areas is an important issue given today's political climate, as well as other considerations. Further, automated detection of objects subjected to imaging can facilitate security tools and other diagnostic systems. One technique used to promote travel safety is through baggage inspection. In some instances, luggage is visually inspected and/or manually inspected by screeners. In other instances, luggage is initially scanned with some type of instrument, and then inspected further if necessary. For example, an x-ray machine may be used to provide security personnel with a substantially two dimensional view of the contents of a bag, thus enabling a determination to be made as to whether further inspection is warranted. However, it may, at times, be time consuming to subject bags to further visual inspection based on an initial automated or human detection. Moreover, the quality of decisions regarding the safety of a piece of luggage, or rather the contents thereof, is a function of the individuals or automated systems making such decisions, and some individuals and/or systems may be more adept at identifying threat items than others.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and techniques that can facilitate an ability for automatic detection of objects in images generated by subjecting an object to imaging using an imaging apparatus, for example, a computed tomography (CT) image of an object under inspection at a security station at an airport. That is, techniques and systems for edge detection of objects in images that generated by imaging apparatus utilizing signal dependent noise, such that the effect of image noise on the edge detection can be mitigated.

Previous attempts at edge detection may not have accounted for signal dependent noise in an image as effectively. Some techniques utilize first and second order derivative operators to detect discontinuities in differences of pixels in an image. However, these techniques are sensitive to image noise and may produce false edges in a noisy image. Image filtering may be used by some techniques, which may avoid some errors generated by noise, however, the filtering can often eliminate some finer edge detection, reducing an ability to detect subtler edges in an image.

Images having signal dependent noise can be generated from a variety of sources, for example, x-ray scanners, gamma-ray scanners, infra-red imaging, and other imaging apparatus. Using the techniques and systems provided herein, edges can be detected in the resulting images utilizing a ratio of intensity values of adjacent region (e.g., pixel) pairs in the image. For example, a matrix with four ratio indices can be generated using a subject region in the image, and four immediately adjacent regions above, below, to the left, and to the right of the subject region. Ratios can be determined by dividing a higher of two adjacent intensity values into the lower of the two values, for respective adjacent regions in the image.

An adaptive threshold value can be generated for respective adjacent region pairs, which can, for example, account for image noise in the image resulting from photonic and electronic noise associated with the particular imaging apparatus and the imaging operation. Pre-filtering of images for noise may not be necessary utilizing the techniques and systems provided herein. In one embodiment, sensitivity of edge detection may be adjusted using a threshold sensitivity value that can account for noise deviation from a statistical mean signal value.

The ratio of intensity values for respective adjacent region pairs can be compared with a corresponding adaptive threshold value to determine whether an edge is present between the adjacent pairs. As an example, if the intensity ratio is higher than the adaptive threshold value, an edge may be detected between the adjacent pairs. In one embodiment, a direction of an edge may be detected by determining whether the detected edge is rising or falling, and in which part of the matrix is located.

In another embodiment, edge detection data may be enhanced to account for a type of object subjected to imaging, and/or to fill in edge details. The data can, for example, be sent to a display for human visual observation, or may be sent to an automatic detection system designed to detect certain object based on the edge data.

In one example, a system is devised for detecting edges in an image that may have been produced by subjecting objects to imaging. Said system can comprise an image intensity ratio determiner, which may be configured to determine image intensity value ratios between adjacent regions in the image. For example, the ratio determiner may determine a ration of intensity values between adjacent pixels in the image. The system may also comprise an adaptive threshold generator. Which can be configured to generate an adaptive threshold value for adjacent regions in the image that can correspond to the adjacent regions for which image intensity value ratios were generated. Further, the system may comprise an edge determiner, which can be configured to identify the presence or absence of an edge between adjacent regions in the image. The edge determiner can compare an image intensity value ratio with a corresponding adaptive threshold value for adjacent regions in the image, for example, to determine if the ratio meets a threshold for the presence of an edge.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Figure 1:
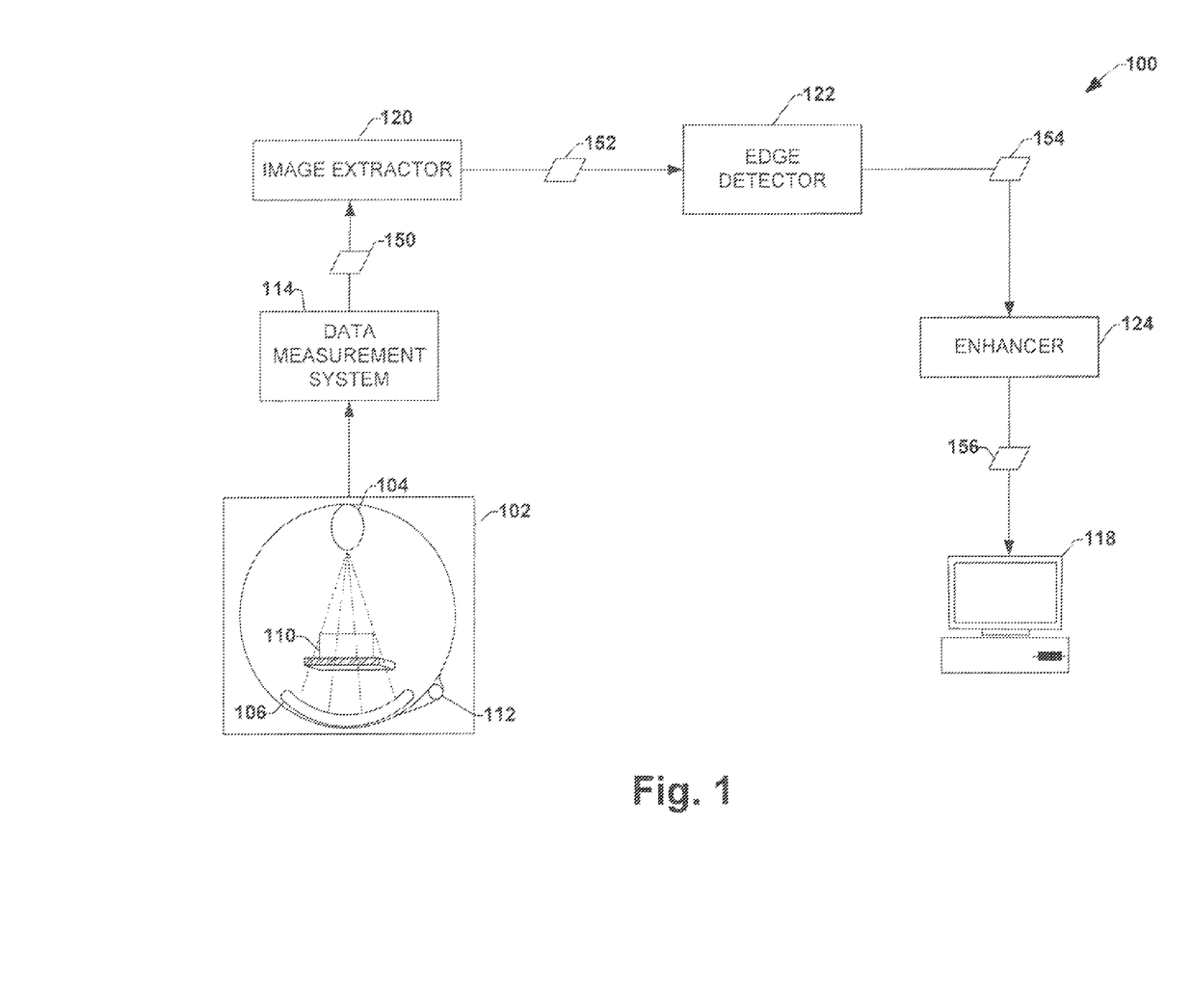
FIG. 1 is a schematic block diagram illustrating an environment wherein edge detection in an image may be implemented as provided herein.

FIG. 1 is an illustration of an example environment 100 in which a system may be employed to detect edges in an image, for example, that results from subjecting one or more objects to imaging using an imaging apparatus. In the example environment 100 the imaging apparatus comprises an object scanning apparatus 102, such as a security scanning apparatus (e.g., used to scan luggage at an airport). The scanning apparatus 102 may be used to scan an object 110 (e.g., a suitcase at the airport). The scanning apparatus typically comprises radiation source 104 (e.g., an X-ray tube), an array of radiation detectors 106 (e.g., X-ray detectors), and a rotator 112 (e.g., a gantry motor) for rotating the radiation source 104 and detectors 106 around the object being scanned 110. It will be appreciated that, while the exemplary environment utilizes an x-ray scanning apparatus, the systems and techniques, described herein, are not limited to x-rays or scanning devices. For example, the system may utilize an infrared imaging device to generate images based on infrared imaging of one or more objects.

As an example, a computer tomography (CT) security scanner 102 that includes an X-ray source 104, such as an X-ray tube, can generate a fan, cone, wedge, or other shaped beam of X-ray radiation that traverses an object 110, such as a suitcase, in an examination region. In this example, the X-rays are emitted by the source 104, traverse the examination region that contains the object 110 to be scanned, and are defected by an X-ray defector 106 across from the X-ray source 104. Further, a rotator 112, such as a gantry motor drive attached to the scanner, can be used to rotate the X-ray source 104 and detector 106 around the object 110, for example. In this way, X-ray projections from a variety of perspectives of the suitcase can be collected, for example, creating a set of X-ray projections for the object. While illustrated as a third generation system, those of ordinary skill in the art will understand that fourth generation and other implementations are also contemplated. As yet another example, the radiation source 104 and detector 106 may remain stationary while the object is rotated.

In the example environment 100, a data measurement system 114 is operably coupled to the scanning apparatus 102, and is typically configured to collect information and data from the detector 106, and may be used to compile the collected data into projection space data 150 for an object 110. As an example, X-ray projections may be acquired at each of plurality of angular positions with respect to the object 110.

In the example environment 100, an image extractor 120 is coupled to the data measurement system 114, and is configured to receive the data 150 from the data measurement system 114 and generate image data 152 indicative of the scanned object 110 using a suitable analytical, iterative, and/or other reconstruction technique (e.g., backprojecting from projection space to image space).

In one embodiment, the image data 152 for a suitcase, for example, may ultimately be displayed on a monitor 118 for human observation. In this embodiment, an operator may isolate and manipulate the image, for example, rotating and viewing the suitcase from a variety of angles, zoom levels, and positions.

It will be appreciated that, while the example environment 100 utilizes the image extractor 120 to extract image data from the data 150 generated by the data measurement system 114, for example, for a suitcase being scanned, the techniques and systems, described herein, are not limited to this embodiment. In another embodiment, for example, image data may be generated by an imaging apparatus and system that is not coupled to the system. In this example, the image data may be stored onto an electronic storage device (e.g., a CD ROM, hard-drive, flash memory) and delivered to the system electronically.

In the example environment 100, an edge detection system may receive the image data 152, for example, for the scanned object 110, to perform edge detection on the image of the object. An edge detector 122, for example, may be configured to detect edges in an image of a scanned object 152, such that an effect of image noise on the edge detection is mitigated.

As an example, the scanning apparatus 102 may comprise a computer tomography (CT) scanner that utilizes x-rays to scan objects for the purpose of determining the object's contents. In this example, an image of the scanned object 152 may be generated, as described above, and sent to the edge detector 122. The edge detector 122 can receive the image for the scanned object and generate edge data 154 for the scanned object 110. In this example, the scanning apparatus 102 may generate image data 152 affected by electronic noise from the scanning apparatus 102 and photon noise from the scanning operation. The edge defector 122 can mitigate the image noise, thereby generating edge data 154 that may reflect an enhanced (e.g., an object may be more recognizable) representation of the scanned object 110 than that which can be generated by current technology. Further, in this example, the edge data 154 can be generated so that it may later be utilized to aid in detecting objects inside a scanned object 110.

Figure 2:
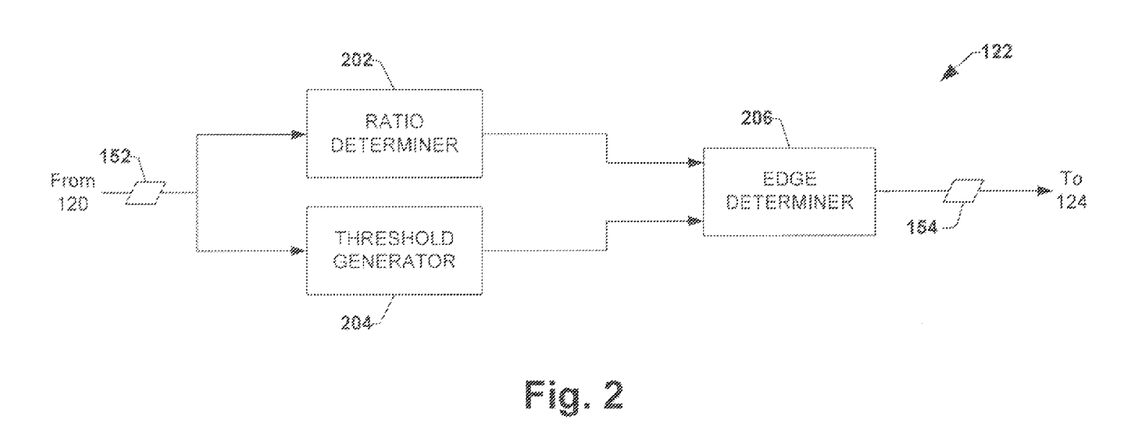
FIG. 2 is a component block diagram illustrating one or more components of an environment wherein edge detection may be implemented as provided herein.

FIG. 2 is a component block diagram of an example edge detector system 122, which may be configured to defect edges in an image, such that the effect of image noise on the edge detection can be mitigated, for example, from an image generated by an x-ray scanning apparatus. The image data 152 is sent from the image extractor 120 and received by an image intensity ratio determiner 202, which can be configured to determine one or more image intensify value ratios (e.g., image signal value ratios) between adjacent regions in the image.

As an example, the image intensity ratio determiner 202 may calculate a ratio value that compares an intensity value of a selected region (e.g., a pixel) in the image with an intensity value of a region immediately adjacent in a row above the selected region. Further, the image intensity ratio determiner 202 may calculate a ratio value for the intensity value of the selected region and the intensity value a region immediately adjacent in a row below. Additionally, the image intensity ratio determiner 202 may calculate ratio values between the intensity value of the selected region and the intensify values of the regions in columns immediately adjacent to the left and right. In this example, the image intensity ratio determiner 202 can generate four region ratio values for respective selected regions in the image, corresponding to ratios of intensity values between the selected region and those immediately adjacent up, down, left and right.

In FIG. 2, the example edge detector 122 further comprises an adaptive threshold generator 204, which receives the image data 152 sent from the image extractor 120. The adaptive threshold generator 204 may be configured to generate an adaptive threshold value for respective adjacent regions in the image data 152 corresponding to the one or more image intensity value ratios. As an example, the adaptive threshold generator 204 may calculate an adaptive threshold value corresponding to respective image intensity value ratios for respective selected regions (e.g., pixels) in an image and adjacent regions. In this example, an intensity value of the selected region ($I_1$) can be summed with a noise value for the selected region ($N_1$), and the resulting selected region sum ($I_1+N_1$) can be divided by an adjacent region sum comprising an intensity value for the adjacent region ($I_2$) and the negative noise value for the selected region ($N_1$) to yield the adaptive threshold value for the corresponding region ratio value (e.g., ($I_1+N_1$)/($I_2 \cdot N_1$) = adaptive threshold value for ratio of pixels 1 and 2)). Additionally, in this example, an adaptive threshold value may be determined for respective region image intensity value ratios for other adjacent regions from the selected region.

In FIG. 2, the example edge detector 122 further comprises an edge determiner 206, which receives region ratio values from the image intensity-ratio determiner 202 and corresponding adaptive threshold values from the adaptive threshold generator 204. The edge determiner 206 can be configured to identify an edge between regions in the image by comparing an image intensity value ratio for adjacent regions in the image with a corresponding adaptive threshold value, resulting in edge data 154 for an image.

In one embodiment, for example, if the image intensity value ratio for adjacent regions is greater than the corresponding adaptive threshold value for the adjacent regions, the edge determiner 206 will detect an edge present between these regions in the image. However, in this example, if the image intensity value ratio is less than or equal to the corresponding adaptive threshold value, no edge is detected by the edge determiner 206.

Figure 3:
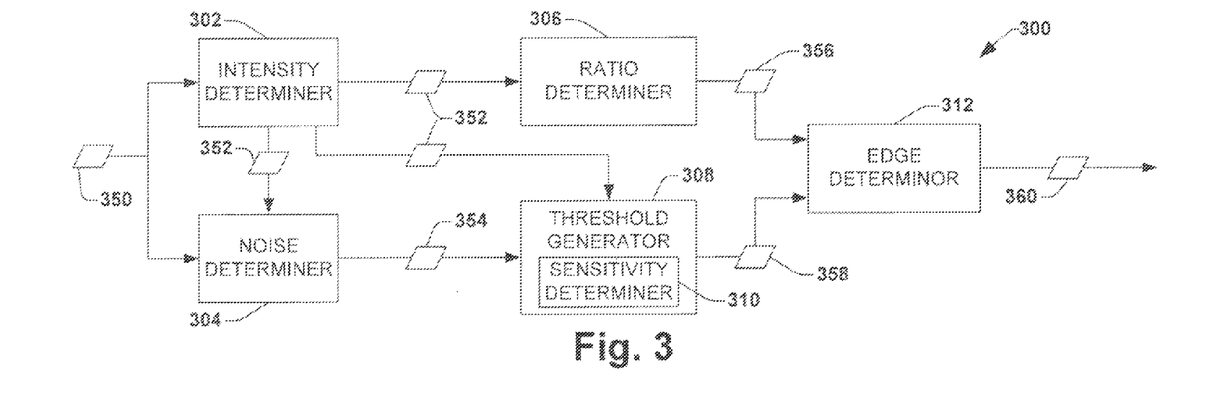
FIG. 3 is a schematic block diagram illustrating one embodiment of one or more components of an environment wherein edge detection may be implemented as provided herein.

FIG. 3 is an example of one embodiment of an edge detection system 300. In the example embodiment 300 image data 350 is sent to an image intensity determiner 302, which may be configured to generate intensity values 352 for respective regions in the image 350. For example, in a gray-scale image produced by scanning an object with x-rays, areas of the object having varying densities may yield varying pixel intensity values.

In the example embodiment 300 image data 350 is also sent to a noise value generator 304, which may be configured to generate a noise value 354 for respective regions of the image 350. As an example, an image's intensity may be affected by noise, which may alter (e.g., augment) the image's intensity in particular regions. Further, in this example, noise may comprise electronic noise from the imaging device used to generate the image, and/or photonic noise from a random arrival of photons on a detector used during the imaging.

In this example embodiment 300, for example, the noise value generator 304 can comprise a noise to intensity function generator, which may be configured to generate a function that represents noise values to intensity values for a variety of images. For example, a variety of objects having varying characteristics and densities can be scanned by a CT scanner, and resulting intensify values for the various images can be graphed against corresponding noise values for the scanner used. In this example, respective imaging apparatus can have unique noise characteristics due to varying apparatus characteristics, therefore, if may be desirable to determine a noise to intensity function for respective imaging devices. Further, a graphical function may be determined that represents the relationship between noise values and intensity values (e.g., $f:\{noise, intensity\}$) for respective imaging devices, for example.

In the example embodiment 300, the noise value generator 304 can further comprise an approximation curve generating component, which can be configured to generate an approximation curve for the function that represents noise values to intensity values. As an example, an approximation curve may not comprise all of the data points that represent the noise to intensity function of an image; however, the approximation curve can represent a suitable approximation of the noise to intensity function.

Additionally, in this embodiment 300, the noise value generator 304 can further comprise a noise value selector, which can be configured to select a noise value from the approximation curve, which corresponds to an intensity value 352 of a region in the image. In this way, for example, the resulting noise value 354 generated by the noise value generator 304, as selected from the approximation curve corresponding to the intensity value 352 for the respective region of the image, may represent an appropriate approximation of the noise present in the respective regions, for a particular imaging apparatus.

In FIG. 3 the embodiment 300 of the example edge detector comprises an image intensity ratio determiner 308. In this embodiment, the image intensity ratio determiner 306 can be configured to determine one or more image intensity value ratios 356 between adjacent regions in the image, as described above (FIG. 2, 202).

Further, in this embodiment 300, the example edge detector comprises an adaptive threshold generator 308, which can be configured to generate an adaptive threshold value for respective adjacent regions in the image corresponding to the one or more image intensity value ratios, as described above (FIG. 2, 204). Additionally, in this embodiment, the adaptive threshold generator 308 can comprise a threshold sensitivity value determiner 310, which is configured to generate a threshold sensitivity value. As an example, a threshold sensitivity value may comprise a constant relating to a statistic of noise for the image (e.g., for a Gaussian distribution of noise for an image generated an imaging apparatus, the Gaussian noise may have a standard deviation of +/−3 from a mean signal; the standard deviation may be used for the threshold sensitivity value).

It will be appreciated that there are several types of noise and noise distributions that may be used by those skilled in the art when determining noise values and threshold sensitivity values for an image generated by an imaging apparatus. For example, 1/f noise (flicker noise), Poisson noise (Poisson distribution), shot noise, thermal noise, burst noise, and others may be considered when determining noise related statistics and calculations, and the techniques and systems, described herein, are not limited to any one type of noise.

Further, in this embodiment, the threshold sensitivity value can be used when generating the adaptive threshold value, for example, to account for edge detection sensitivity relative to noise. In this example, a noise value for respective regions in an image can be multiplied by the threshold sensitivity value, prior to summing the noise value with the intensity value, when calculating the adaptive threshold value (e.g., as described above). In this embodiment, an example of a formula for calculating the adaptive threshold value is as follows;

(Intensity value for region 1+(Noise value for region 1×threshold sensitivity value constant))/(Intensity value for region 2−(Noise value for region 1×threshold sensitivity value constant))=adaptive threshold value for ratio of regions 1 and 2

Additionally, in this embodiment, the adaptive threshold generator 308 can be configured to generate an adaptive threshold value 358 if the noise value for a first region is significantly less than the intensity value for the first region and the noise value for the first region is approximately equal to a noise value of an adjacent region. In this way, for example, the resulting adaptive threshold value 358 may appropriately represent a threshold that can account for changes in intensity values that are a result of possible edges present and not a result of changes in noise between regions.

In FIG. 3, the example edge detector comprises an edge determiner 312, which receives the image intensity value ratios 356 from the ratio determiner 306, and the adaptive threshold values 358 from the threshold generator 308. The edge determiner 312 is configured to identify an edge between regions in toe image by comparing the image intensity value ratio 356 for adjacent regions in the image with a corresponding adaptive threshold value 358, as described above (FIG. 2, 206), resulting in edge data 360 for the image.

Turning back to FIG. 1, in the example environment 100, the edge data 154 for an image, indicative of the object 110 that has been subject to imaging by an imaging apparatus 102, is sent to an edge enhancer 124. The edge enhancer 124 can be configured to correct detected edges based on one or more weighting factors. As an example, edge data may be collected from imaging of known objects and the known edge data may be used to extrapolate edges from the detected edge data 154, in order to generate enhanced edge data 158 that more indicative of the object 110 subjected to imaging by the imaging apparatus 102. Further, for example, a multiplier value may be applied to the edge data 154 that corresponds to known information for various objects imaged by the system (e.g., when attempting to generate edge data for object inside a suitcase subjected to a CT scan, multiplier corresponding to the type of suitcase may be applied).

In the example environment 100, an enhanced image showing the detected edges is sent to a display device 118, which can be configured to display a view of edges detected, for example, in the image of the object 110 subjected to the imaging apparatus 102. In one embodiment, an operator may isolate and manipulate the view of the edges, for example, rotating and viewing the displayed image of the edges from a variety of angles, zoom levels, and positions. In this way, the operator may be able to identify an object item, for example, inside a suitcase being scanned.

Figure 4:
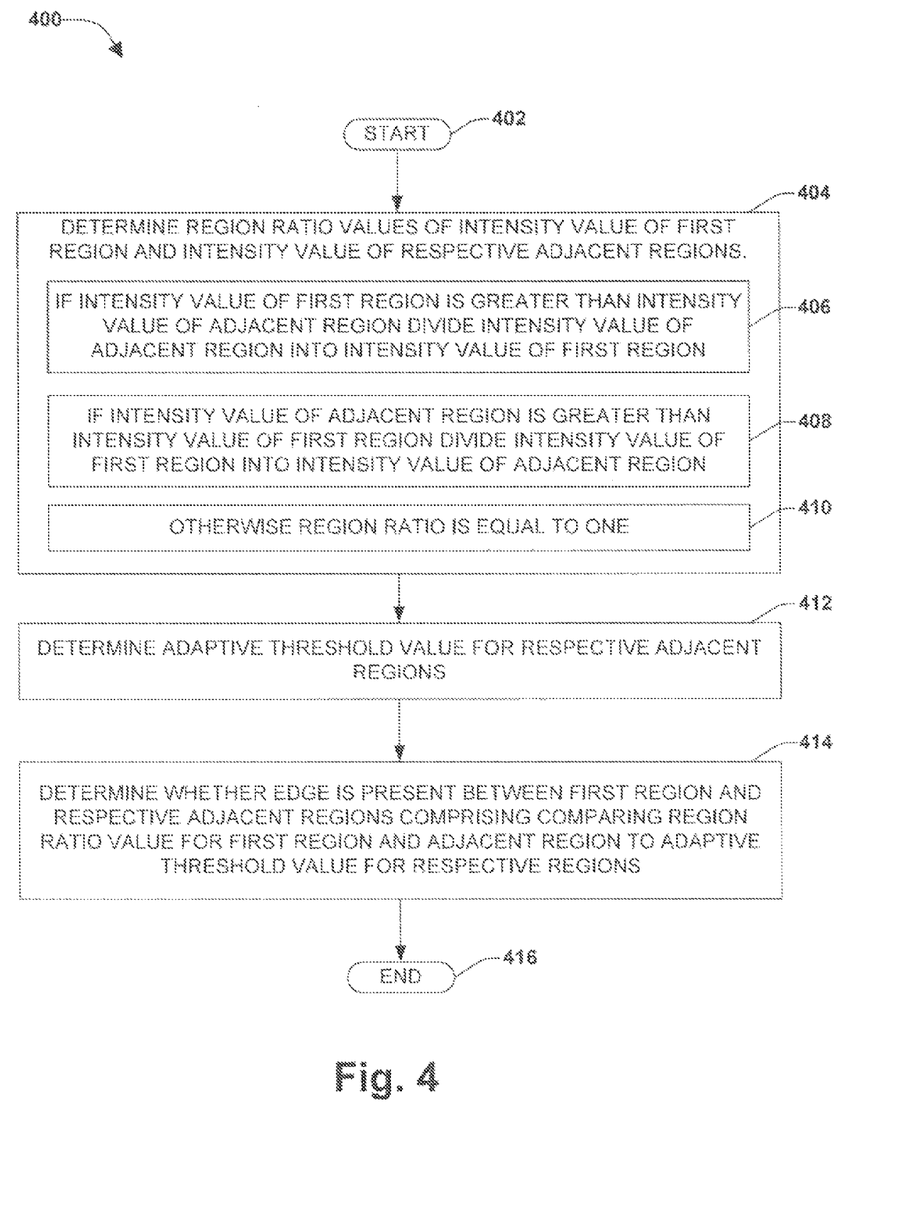
FIG. 4 is a flow chart diagram of an example method for detecting edges in an image produced by imaging of one or more objects.

A method may be devised for defecting edges in an image produced by imaging of one or more objects, such that the effect of image noise on the edge detection can be mitigated. FIG. 4 is a flow chart diagram of an example method 400 for detecting edges in an image produced by imaging of one or more objects. The example method 400 begins at 402 and involves determining region ratio values of a first region (e.g., pixel) and respective adjacent regions, at 404. As an example, an intensity value of a subject region may be compared with an intensify value of a region immediately adjacent to the subject region to generate a ratio value of the respective regions.

At 406, if an intensity value of a first region (e.g., the subject pixel) is greater than the intensify value of an adjacent region, determining the ratio value of adjacent regions comprises dividing the intensity value of the adjacent region into the intensity value of the first region. For example, if the intensity value of the subject region is four hundred and the intensity value of the adjacent region is one hundred counts, the resulting ratio value would be four.

On the other hand, at 408, if the intensity value of the adjacent region is greater than the intensity value of the first region, determining the ratio value of adjacent regions comprises dividing the intensity value of the first region into the intensity value of the adjacent region. For example, if the intensity value of the subject region is two hundred counts and the intensity value of the adjacent region is four hundred counts, the resulting ratio value would be two. At 410, if the intensity value of the first region is equal to the intensity value of the adjacent region, the region ratio value for adjacent regions will be equal to one.

In the example method 400 at 412, an adaptive threshold value (ATV) for respective adjacent regions is determined. In one embodiment, for example, the ATV can be determined by dividing the sum of an intensity value of the first region $(I(x,z))$ and a noise value of the first region $(E(x,z))$ by a sum of an intensity value of an adjacent region $(I(x+1,z))$ and a negative noise value of the first region $(-E(x,z))$. In this embodiment, a formula for determining the ATV for respective adjacent regions can be the following:

$$(I(x,z)+E(x,z))/(I(x+1,z)-E(x,z))=ATV$$

In the example method 400 at 414, the region ratio value for the first region and the adjacent region is compared to the ATV for the respective regions to determine whether an edge is present between the respective adjacent regions. In one embodiment for example, the ATV for respective adjacent regions can be divided into the corresponding region ratio value for the adjacent regions. In this example, if the resulting quotient is greater than one and edge is detected; and if the quotient is less than or equal to one and edge is not detected.

Having determined whether an edge is present between respective adjacent regions, the exemplary method 400 ends at 414.

In one aspect, the example method 400 can comprise determining region intensity values for a first region (e.g., a subject region) and for those regions immediately adjacent to the first region. Further, for example, an arrangement of region intensity values used when calculating the region ratio values can indicate a direction of an edge in an image. As an example, if a region intensity value of a subject region is greater than a region intensity value of a region in a row immediately adjacent below the subject region, a falling edge may be detected between the respective adjacent regions. This information may be combined with the edge detection techniques to facilitate determining a direction of those edges detected in the image.

Figure 5:
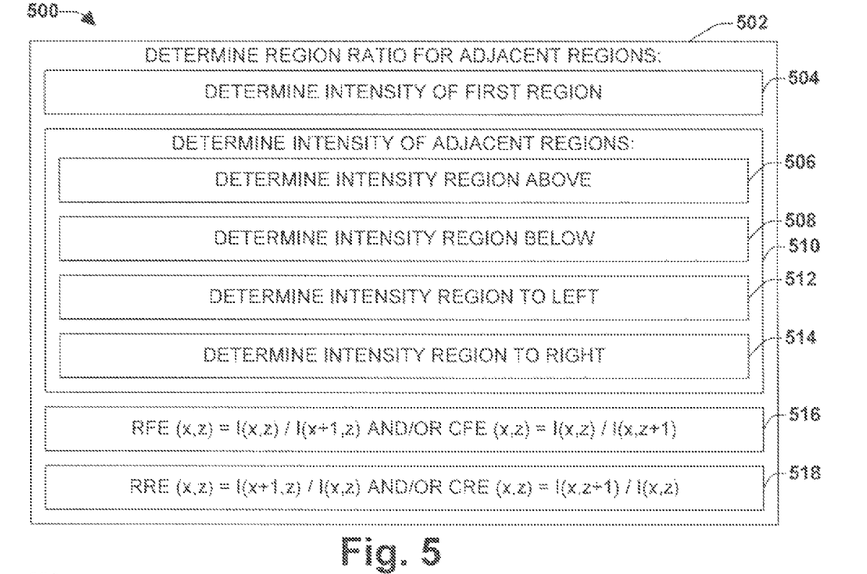
FIG. 5 is a flow chart diagram of one embodiment of an example method for determining region ratio values for respective sets of adjacent regions.

FIG. 5 is an illustration of one embodiment 500 of a method 502 for determining region ratio values for respective sets of adjacent regions. At 504, the intensity value of a first region (e.g., pixel) is determined. As an example, the intensity value for respective pixels in an image can be determined, and respective pixels can be a first pixel (e.g., a subject pixel) subjected to edge detection with respect to adjacent pixels.

At 510, an intensity value for those regions immediately adjacent to the first region can be determined. In this embodiment, intensity values can be determined for those regions in rows immediately above and below the first region, at 506 and 508, and for those regions in columns immediately to the left and right of the first region, at 512 and 514.

At 516, one or more indications of a falling edge between respective adjacent regions may be determined. For example, if the intensity value for the first region (I(x,z)) is greater than the intensity value for a region in an adjacent row above the first region (I(x+1,z)), indications of a rows falling edge (RFE) may be detected by dividing I(x+1,z) into I(x,z) (e.g., as described above in FIG. 4, 406). Further, if the intensity value for the first region (I(x,z)) is greater than the intensity value for a region in an adjacent column to the right of the first region (I(x,z+1)), indication of a columns falling edge (CFE) may be detected by dividing I(x,z+1) into I(x,z) (e.g. as described above in FIG. 4, 406).

At 518, one or more indications of a rising edge between respective adjacent regions may be determined. For example, if the intensity value for the first region (I(x,z)) is less than the intensity value for a region in an adjacent row above the first region (I(x+1,z)), indications of a rows rising edge (RRE) may be detected by dividing I(x,z) into I(x+1,z) (e.g., as described above in FIG. 4, 408). Further, if the intensity value for the first region (I(x,z)) is less than the intensify value for a region in an adjacent column to the right of the first region (I(x,z+1)), indications of a columns rising edge (CRE) may be detected by dividing I(x,z) into I(x,z+1) (e.g., as described above in FIG. 4, 408).

Figure 9:
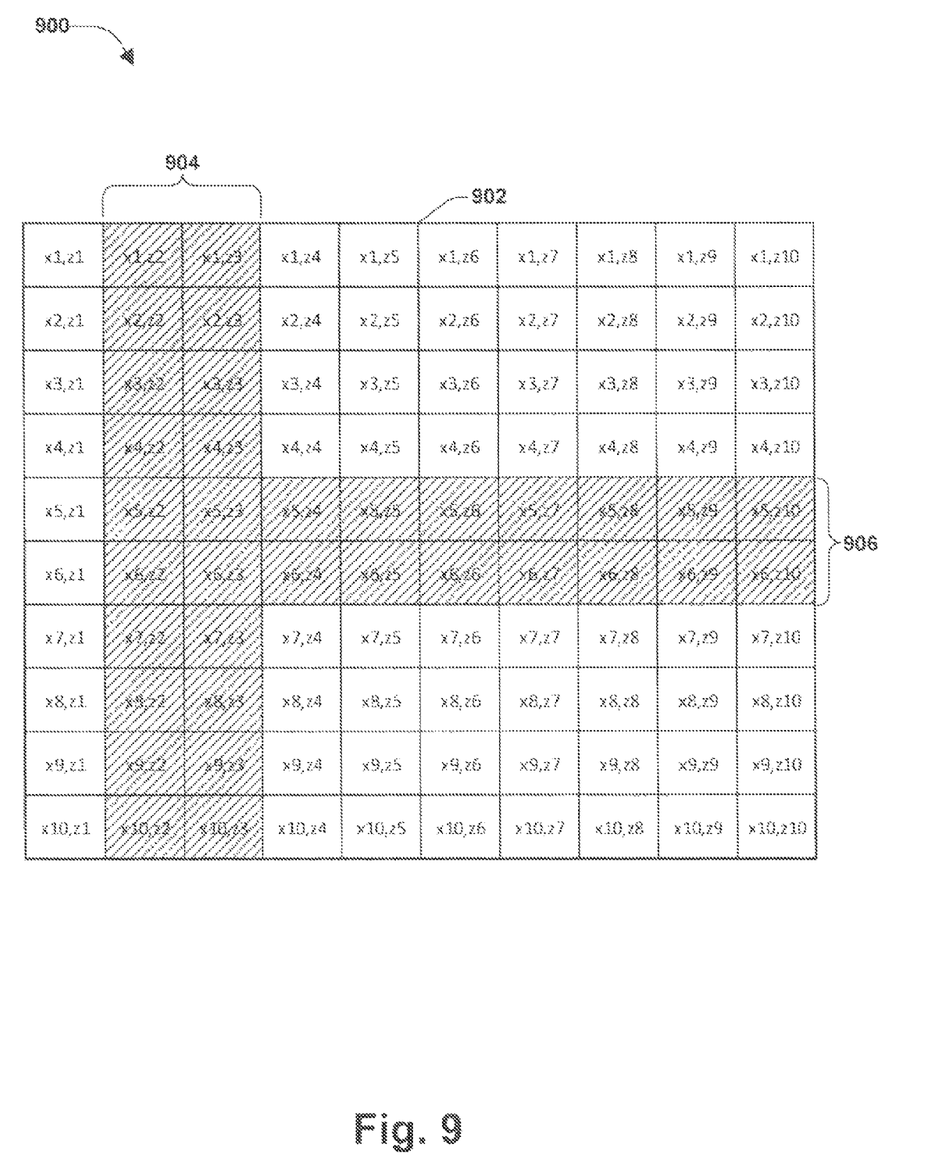
FIG. 9 is an illustration of an example image divided into regions, and having areas of different image intensity.

FIG. 9 is an illustration of an example image 900 divided into regions 902, and having areas of different image intensity 906 and 904. As an example, a subject region (x7,z4) has four immediately adjacent regions (x6,z4) above, (x7,z5) to the right, (x8,z4) below, and (x7,z3) to the left, for which intensity values can be determined. In this example, the regions located above (x6,z4) and to the left (x7,z3) comprise areas of significantly less image intensity (e.g., darker shaded areas), therefore an edge may be present between the subject region (x7,z4) and the regions (x6,z4) and (x7,z3). When determining the intensity ratio value between the subject region (x7,z4) and region (x6,z4), as described above, the intensify value of (x6,z4) will be divided into the intensity value of (x7,z4), for example. This illustrates an example of RFE, whereby the edge is falling toward the subject region as the image transitions between the dark shaded area 906 toward the light area of region (x7,z4).

Figure 6:
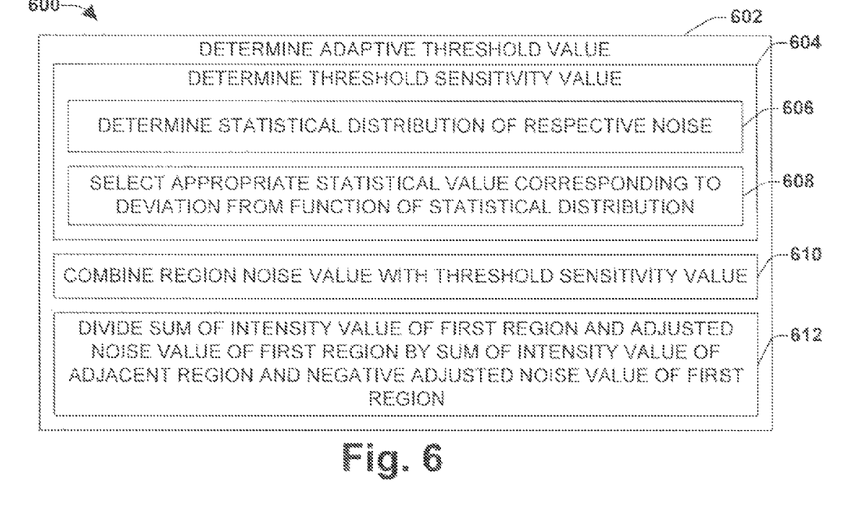
FIG. 6 is a flow chart diagram of one embodiment of an example method for determining an adaptive threshold value.

In another aspect, determining an adaptive threshold value (ATV), as in 412 of FIG. 4 described above, can involve using a threshold sensitivity value (TSV). In this aspect, the TSV can be utilized in calculating the ATV, end can account for sensitivity of the edge detector, for example, facilitating the edge detector to detect subtle edges in an image of an object. FIG. 6 is an illustration of one embodiment 600 of a method 602 for determining an ATV.

At 604, the TSV is determined and comprises determining a statistical distribution of the respective noise, at 606. As an example, a Gaussian distribution of the noise for an imaging apparatus used to create images of objects can be determined. At 608, a statistical value that corresponds to a deviation value from a function of the statistical distribution of the respective noise is selected as the TSV. For example, in a Gaussian distribution of noise, signal values vary by approximately +/−three standard deviations. Therefore, in this example, the standard deviation from the mean signal value can be selected as the TSV for this type of noise.

In the example embodiment 600, at 610, the TSV is combined with a noise value for respective adjacent regions, generating an adjusted noise value. For example, the noise value for respective regions subjected to edge detection can be multiplied by the TSV. In this example, multiplying the noise value by the TSV can adjust the sensitivity of the ATV. In this example, having a small TSV may facilitate the ATV in detecting subtle edges in the image. Conversely, for example, having a large TSV may facilitate the ATV in filtering out noisy edges in the image.

At 612, the ATV is determined as described above (FIG. 4, 412) by dividing the sum of an intensity value of the first region (I(x,z)) and an adjusted noise value of the first region (TSV*E(x,z)) by a sum of an intensity value of an adjacent region (I(x+1,z)) and a negative adjusted noise value of the first region (−TSV*E(x,z)). In this embodiment, a formula for determining the ATV for respective adjacent regions can be the following:

$$(I(x,z)+(TSV*E(x,z)))/(I(x+1,z)-(TSV*E(1,z)))=ATV$$

Figure 7:
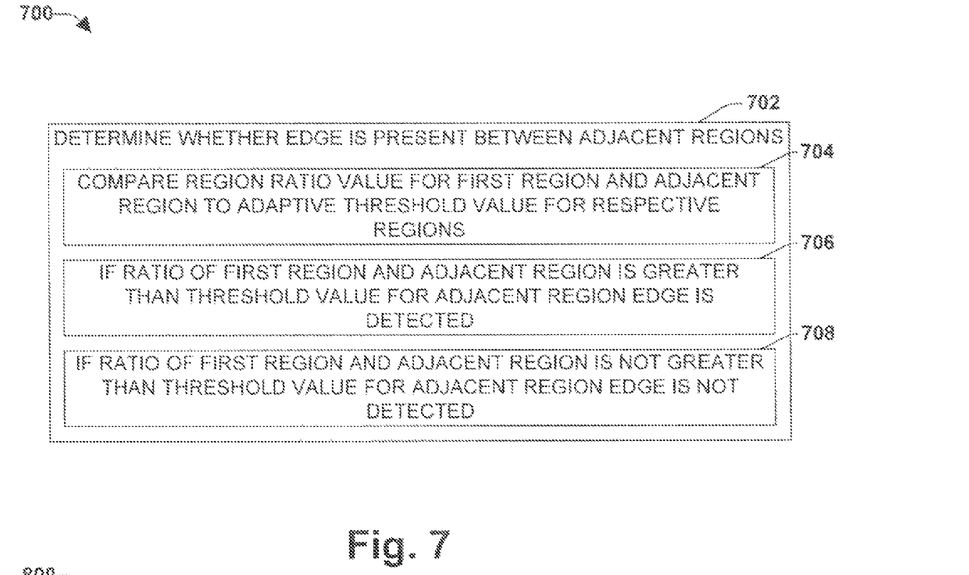
FIG. 7 is a flow chart diagram of one embodiment of an example method for determining whether an edge is present between two adjacent regions.

In another aspect, the adaptive threshold value (ATV) can be used to determine whether an edge is present between adjacent regions by comparing the ATV with a region ratio value for the adjacent regions, as described above (FIG. 4, 414). FIG. 7 is one embodiment of an example method 700 for determining whether an edge is present between two adjacent regions. The example method begins at 702 and involves comparing a region ratio value (RRV) for a first region and an adjacent region with a corresponding ATV for the first and adjacent regions. At 706, if the RRV is greater than the ATV an edge is detected between the first and adjacent regions. However, at 708, if the RRV is not greater than (e.g., less than or equal to) the ATV an edge is not detected between the first and adjacent regions.

In one embodiment, for example, as illustrated in FIG. 9, a subject region (x4,z7) and adjacent regions above (x3,z7), to the right (x4,z8), and to the left (x4,z8) will likely have respective RRVs that are less than or equal to respective ATV for the adjacent region pairs (e.g., an adjacent region pair comprising the subject region and one of the adjacent regions), as the intensity values will be similar. However, in this example, the RRV for the adjacent region pair comprising the subject region (x4,z7) and the adjacent region below (x5,z7) will likely be greater than the ATV for this adjacent region pair, as an edge is present between these regions.

Additionally, in another embodiment, the information that an edge is detected between adjacent regions may be combined with information concerning rising and failing edges, as described above (FIG. 5, 516 and 518), to facilitate a determination of directions of edges detected in the image.

In another aspect, region noise values can be determined so that they may be used in calculating adaptive threshold values (ATVs). In this aspect, for example, intensify values for respective regions in an image can comprise noise resulting from imaging an object using an imaging apparatus. In this example, electronic noise from the imaging apparatus and the imaging process may contribute to the intensity value of regions in the resulting image. Further, photonic noise from random photons striking a detector in the imaging apparatus during the imaging process can also contribute to the intensity value of regions in the resulting image, for example.

In this aspect, for example, the noise value for respective regions may be used in calculating the ATV in order to mitigate noise as a factor when detecting intensity value changes between adjacent regions (e.g., if a pixel intensity ratio is higher than the ATV a change in intensity is independent of the noise of the pixel, and is therefore an actual change in intensity).

Figure 8:
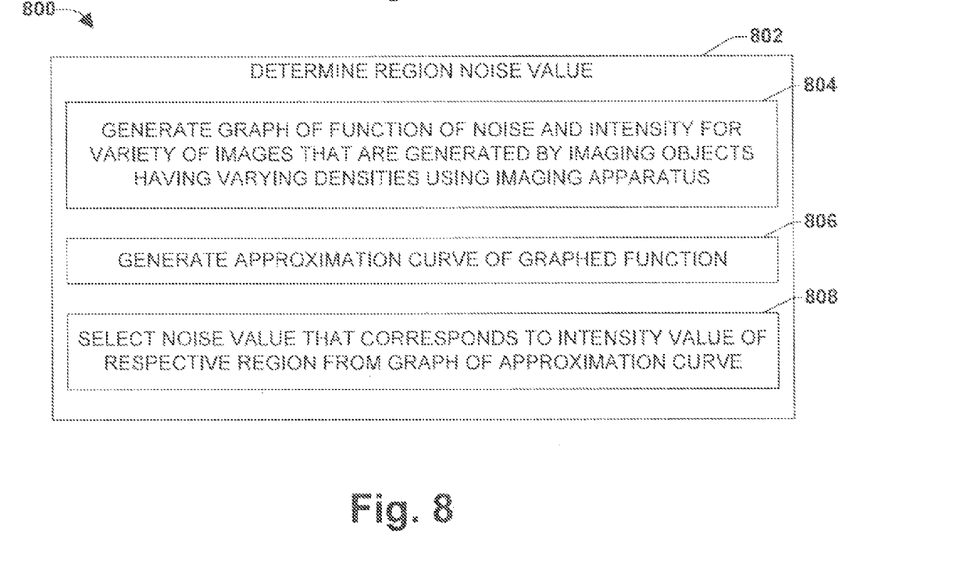
FIG. 8 is a flow chart diagram of one embodiment of an example method for determining a region noise value for respective regions in an image.

FIG. 8 is an illustration of one embodiment 800 of a method 802 for determining a region noise value for respective regions in an image. At 804, a graph of a function of noise versus intensity is generated that comprises data points from a variety of images, the images having been generated by subjecting a variety of objects to imaging, using an imaging apparatus. As an example, a CT scanner may be used to scan objects having varying densities (e.g., from a newspaper up to a metal machine part). The resulting images may be used to calculate intensity values and corresponding noise counts (e.g., counts represented by a magnitude in root mean square (RMS)). These values may be plotted on a graph to create a function (e.g., a curve) of noise versus intensity ($f$:{noise, intensity}) for the imaging apparatus used.

At 806, an approximation curve can be generated that approximates the plotted function of noise and intensity for the imaging apparatus. As an example, an approximation curve may not comprise all of the data points plotted for the function $f$:{noise,intensity}, but can be an appropriate representation of the plotted function.

At 808, a noise value may be selected from the approximation curve that corresponds to an intensity value of the respective regions. As an example, to determine the noise value of a region in an image one can select the noise value that intersects the approximation curve at the point of the intensify value for that region. In this way, approximate noise values can be selected based on intensity values, which have been generated for a particular imaging apparatus, for example.

Figure 10:
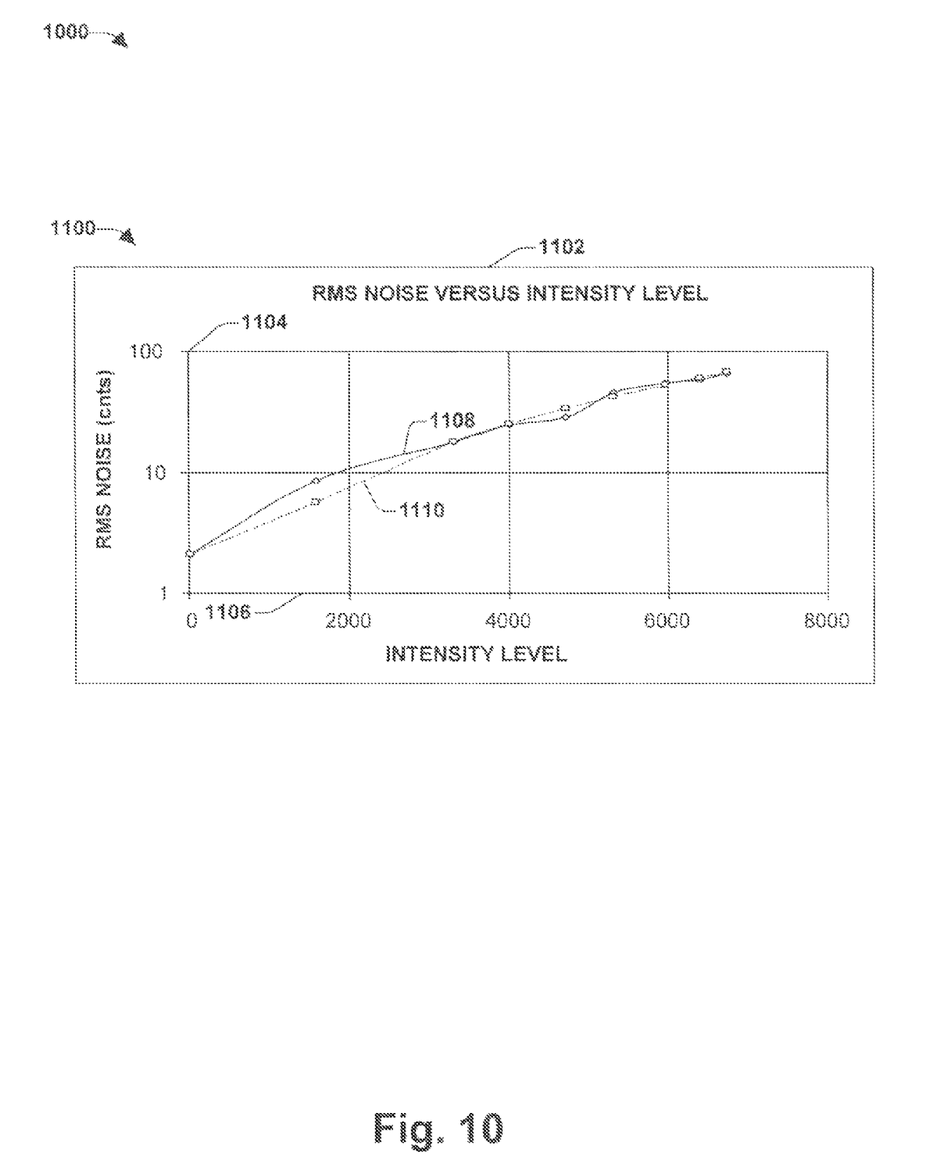
FIG. 10 is an illustration of an example graph of a function of noise versus intensity, generated from imaging a variety of objects having varying densities.

FIG. 10 is an illustration of an example graph 1000 of a function of root mean square (RMS) noise counts versus intensify levels, generated from imaging a variety of objects having varying densities. In this example graph 1000 the "Y" axis comprises RMS noise counts 1004 and the "X" axis comprises intensity levels 1006 (e.g., signal levels). A function of the noise versus intensity levels is plotted in a linear curve 1008, and an approximation curve 1010 is interpolated for the function curve. In this example graph 1000, the approximation curve 1010 composes first and last data points from the function curve, and approximates the remaining linear curve.

As an example, if a subject region in an image generated by imagining an object using a same imaging apparatus as used to generate the example graph 1000 has an intensity value of one thousand nine hundred on the "X" axis 1006, the corresponding noise value is approximately ten on the "Y" axis 1004. Therefore, in this example, for regions in the image having an intensity value of one thousand nine hundred, a corresponding noise value for those regions can be ten, for images generated by the imaging apparatus.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skied in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "composing."

What is claimed is:

1. A method for detecting an edge in an image produced by imaging of one or more objects, comprising:
   determining an intensity ratio value for a portion of an image, the portion comprising of a first region and a second region, the second region adjacent to the first region
   determining an adaptive threshold value for the portion, comprising:
      dividing a sum of an intensity value for the first region and a noise value for the first region by a difference between an intensity value for the second region and the noise value for the first region; and
   determining whether an edge is present between the first region and the second region comprising comparing the intensity ratio value to the adaptive threshold value.

2. The method of claim 1, the determining an intensity ratio value comprising:
   dividing the intensity value for the first region by the intensity value for the second region when the intensity value for the first region is greater than the intensity value for the second region;
   dividing the intensity value for the second region by the intensity value for the first region when the intensity value for the second region is greater than the intensity value for the first region; and
   setting the intensity ratio value equal to one when the intensity value for the first region is equal to the intensity value for the second region.

3. The method of claim 1, the first region corresponding to a first pixel of the image and the second region corresponding to a second pixel of the image.

4. The method of claim 1, the determining whether an edge is present comprising:

detecting an edge when the intensity ratio value is greater than the adaptive threshold value; and not detecting an edge when the intensity ratio value is not greater than the adaptive threshold value.

5. The method of claim 1, the image produced by at least one of:
computed tomography (CT) imaging;
x-ray imaging;
gamma-ray imaging;
infrared imaging;
electromagnetic imaging; or
an imaging apparatus that generates images comprising signal dependent noise.

6. The method of claim 1, the image subjected to edge detection without using one or more pre-filters for mitigating noise.

7. The method of claim 1, comprising:
determining the noise value for the first region; and
combining the noise value for the first region with a threshold sensitivity value prior to the dividing.

8. The method of claim 7, the threshold sensitivity value comprising a deviation value from a function representative of a statistical distribution of noise.

9. The method of claim 8, the statistical distribution comprising a Gaussian function distribution.

10. The method of claim 7, the threshold sensitivity value comprising a constant statistical value.

11. The method of claim 1,
the noise value for the first region approximately equal to a noise value for the second region.

12. The method of claim 1, comprising determining the noise value for the first region comprising:
generating a graph of a function of noise and intensity for a variety of images;
generating an approximation curve for the function; and
selecting a noise value along the approximation curve that corresponds to the intensity value for the first region.

13. The method claim 12, the variety of images comprising images generated by subjecting objects having varying densities to imaging using an imaging apparatus.

14. A system for detecting an edge in an image produced by subjecting one or more objects to imaging, comprising:
an image intensity ratio determiner configured to determine an intensity ratio value for a portion of an image, the portion comprising a first region and a second region, the second region adjacent to the first region;
an adaptive threshold generator configured to generate an adaptive threshold value for the portion by dividing a sum of an intensity value for the first region and a noise value for the first region by a difference between an intensity value for the second region and the noise value for the first region; and
an edge determiner configured to identify an edge between the first region and the second region by comparing the intensity ratio value to the adaptive threshold value.

15. The system of claim 14, comprising a noise value generator configured to generate the noise value for the first region, the noise value generator comprising:

a noise to intensity function generator configured to generate a function that represents noise values to intensity values for a variety of images;
an approximation curve generating component configured to generate an approximation curve for the function; and
a noise value selector configured to select a noise value along the approximation curve that corresponds to the intensity value for the first region.

16. A non-transitory computer readable medium comprising computer readable instructions that when executed perform a method for detecting an edge in an image produced by imaging an object, the method comprising:
determining an intensity ratio value for a portion of an image, the portion comprising a first region and a second region, the second region adjacent to the first region;
determining a noise value for the first region, comprising:
generating a graph of a function of noise and intensity for a variety of images;
generating an approximation curve for the function; and
selecting a noise value along the approximation curve that corresponds to an intensity value for the first region;
determining an adaptive threshold value for the portion based upon the noise value; and
determining whether an edge is present between the first region and the second region comprising comparing the intensity ratio value to the adaptive threshold value.

17. The non-transitory computer readable medium of claim 16, the determining an adaptive threshold value comprising:
dividing a sum of the intensity value for the first region and the noise value for the first region by a difference between an intensity value for the second region and the noise value for the first region.

18. The non-transitory computer readable medium of claim 16, the first region corresponding to a first pixel of the image and the second region corresponding to a second pixel of the image.

19. The non-transitory computer readable medium of claim 16, the determining an intensity ratio value comprising:
dividing the intensity value for the first region by an intensity value for the second region when the intensity value for the first region is greater than the intensity value for the second region;
dividing the intensity value for the second region by the intensity value for the first region when the intensity value for the second region is greater than the intensity value for the first region; and
setting the intensity ratio value equal to one when the intensity value for the first region is equal to the intensity value for the second region.

20. The non-transitory computer-readable medium of claim 17, the method comprising:
determining the noise value for the first region; and
combining the noise value for the first region with a threshold sensitivity value prior to the dividing.

* * * * *